3,513,383
OPTICALLY PUMPED HELIUM MAGNETOMETER
Ralph E. Hartline, and Frederic Henry Meister, Tulsa, Okla., assignors to Sinclair Research, Inc., New York, N.Y., a corporation of Delaware
Filed Jan. 4, 1968, Ser. No. 695,766
Int. Cl. G01r 33/08; H01s
U.S. Cl. 324—.5                                                    1 Claim

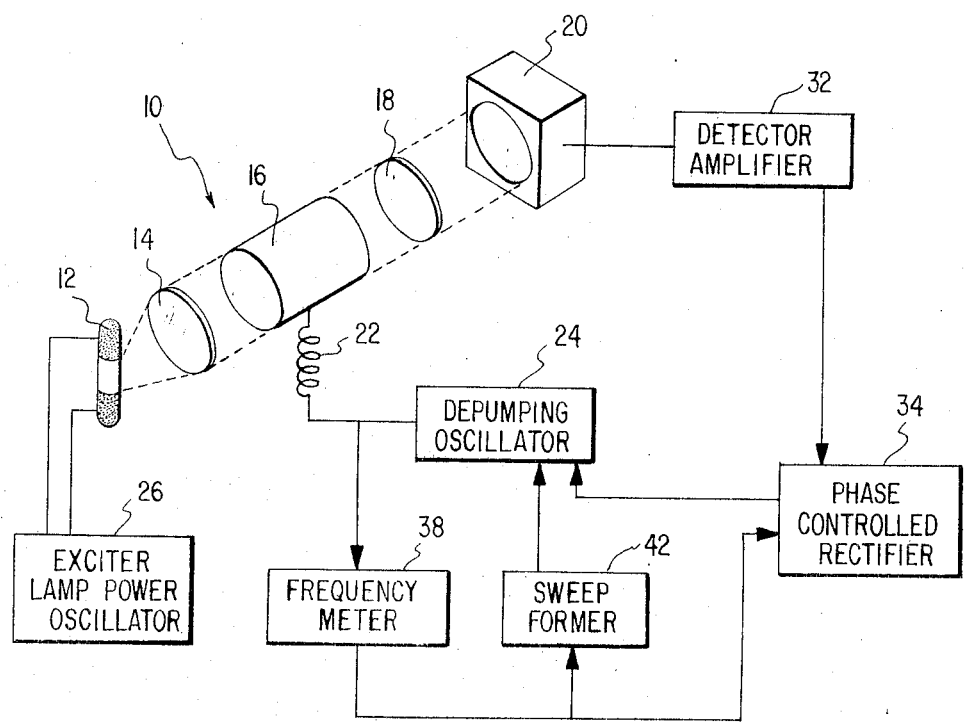

ABSTRACT OF THE DISCLOSURE

A device for measuring the strength of a magnetic field comprising a contained body of helium gas the atoms of which are acted upon by the magnetic field when in the presence thereof; means to excite the body of helium gas for continuously producing metastable helium atoms; a source of resonance radiation impingeable upon and interacting with the body of helium gas for producing alignment of the metastable helium atoms contained therein; means to create and direct into the body of helium gas a field of such frequency as to diminish the alignment of metastable helium atoms contained in a body of helium gas; means to measure the changes in the amount of resonance radiation absorbed by the metastable helium atoms, and means for improving the signal input to said last-mentioned means comprising a narrow pass filter means passing only radiation at the 1.08-micron resonance line of helium arranged in the path of the radiation after the body and before the measuring means.

---

The recent advent of high sensitivity optical absorption magnetometers to measure minute fluctuations in the intensity of the earth's magnetic field has greatly expanded the ability of geophysical prospectors to locate and identify subterranean deposits of oil and precious metals. Furthermore, the precision of magnetic field detection by optical absorption magnetometers is so exact that such magnetometers permit airborne exploration of uncharted terrain, thereby greatly increasing both the speed of geophysical exploration and the ability of prospectors to reach remote and inaccessible terrain for geophysical examination.

The operation of optical absorption magnetometers, such as the metastable helium magnetometer, used in the system of this invention, is dependent upon the quantized nature of the absorption and radiation of energy of the atom. The "planetary" electrons of any atom can exist only in certain specific energy levels. In their lowest or ground state the electrons are stable. However, the electrons can be excited to certain specific and higher energy states by supplying to the system the exact quantity of energy equal to the difference between the higher and the original state. The electron can exist at the higher state of a time which can be found by statistical considerations. As the excited electron returns to a "permissible" lower state the atom radiates an amount of electromagnetic energy equal to the energy difference involved in the transfer. It is significant that the frequency of this radiation is directly proportional to the energy difference.

Helium is of particular interest in magnetometry because it has atomic excitation states in which the energy differences are particularly suitable for measurement with the aid of recently developed optical pumping methods. The operation of the helium magnetometer involves transitions between a pseudo ground energy state, the metastable state and the first excited state of the P spectral series. This first excited state has three sublevels so that the spectral line resulting from these transitions has three closely spaced components. These correspond to the 1.083-micron wavelength spectral line of helium. Under the action of a magnetic field the metastable state is divided into three Zeeman sublevels while the three substates of the first excited states are divided into one, three and five Zeeman sublevels.

When a population of helium atoms in the metastable state is exposed to the 1.083-micron resonance radiation of helium in a magnetic field certain of the atoms absorb radiation quanta and are excited to specific allowable substates of the first excited state. Excitation with light of random polarization results in a certain distribution of atoms between the substates of the first excited state which may be designated as normal. In subsequently returning to the allowable substates of the metastable state, these atoms radiate the equivalent energy change as 1.083-micron resonance radiation. The resulting distribution of atoms between the substates of the metastable state also achieves a form that may also be designated as normal.

By irradiating helium atoms in the metastable state with a beam of circularly polarized light parallel to the magnetic field, certain allowable transitions are effected to the exclusion of others. This results in an abnormal distribution of the population of atoms between the several substates of the first excited state. This change of distribution of energy between the substates as a result of irradiation by circularly polarized light is a form of optical pumping. Upon return to the metastable state through allowable transitions from this abnormal, pumped distribution, the resulting distribution in the metastable state becomes abnormal. In effect the initial optical pumping accomplished in the first or absorption transition is carried on the second or radiation transition.

Insofar as optical magnetometry is concerned, it is only the abnormal distribution resulting in the metastable state that is of interest. The difference in energy and hence the quantum equivalent frequency difference between the Zeeman substates of the metastable state is proportional to the strength of the magnetic field. In fact, it is a fraction consisting of the ratio of small integers, determined by the Lande "$g$" factor, times 14.0 cycles per second frequency change per gamma change in the magnetic field flux density. When circularly polarized resonance radiation is used for optically pumping in helium the greater amount of the stored energy is in the substates for which the Lande "$g$" factor is 2/1. Thus the effective energy difference between the Zeeman sublevels has a quantum frequency equivalent of 28.0 cycles per second change of frequency per gamma change of the magnetic field. If the total frequency equivalent for the pumped energy storage in the metastable state can be determined, the intensity of the magnetic field flux in which the pumped atoms are found can be determined in gammas simply by dividing this frequency by the conversion factor 28.0 cycles per second per gamma flux density.

The irradiation of the helium sample with the circularly polarized 1.083-micron resonance radiation decreases the stability of the atoms in the metastable substates which are in a position to absorb quanta for excitation to the several substates of the first excited state. Additionally the continued irradiation reduces the stability in these receiving substates so that return to pumped condition in the metastable condition occurs at an accelerated rate. As a consequence there is no substantial accumulation of atoms in the abnormal distribution of the first excited state. This means that the collection of energy by optical pumping in this state is not very great. However, the atoms which return to the metastable state at the completion of the optical pumping portion of the cycle rest in positions that are relatively unaffected by the circularly polarized resonance radiation. The abnormality of the population of atoms in these substates continues to increase until the loss to each substate from other causes equals the gross pumping rate, that is until the net pumping rate is reduced to zero.

At the instant that the circularly polarized 1.083-micron resonance radiation is introduced to the sample of helium atoms, a large fraction of atoms are in metastable substates capable of absorbing these resonance quanta. However, as these states are depleted by the continuation of the pumping process, the number of atoms in absorbing substates decreases so that the sample becomes increasingly transparent to the exciting radiation. The increase in the intensity of exciting radiation passing through the helium sample thus becomes a measure of the progress of the pumping operation.

The abnormal population developed in the metastable substates by the pumping operation reaches an equilibrium condition as previously noted. This abnormal equilibrium can be disturbed by reducing the stability of the condition by applying an electromagnetic field at the resonance frequency of this state. This is the quantum equivalent frequency of the Zeeman substates in which the abnormal distribution occurs and the frequency has been shown to be interpretable in the terms of the magnetic flux density. This electromagnetic probing field can be applied, for example, by passing a radio frequency current through coils appropriately placed near the test sample resonance absorption cell. As the appropriate frequency field is applied to the absorption cell, the stability of atoms in the pumped substates is reduced and their populations return toward their normal values. This depumping restores the population in the substates which absorb the resonance radiation and the pumping cycle starts over again.

The amount of depumping, and hence the subsequent increase in the absorption for the resulting pumping cycle will be greatest when the depumping frequency exactly corresponds to the Zeeman resonance frequency and will decrease as the depumping frequency increases above or decreases below this diagnostic frequency. It is thus apparent that a monitoring of the variation of intensity of the transmitted resonance radiation as the depumping field is applied to the system can be made to establish when the depumping frequency is identical to the wanted Zeeman frequency.

A helium metastable magnetometer logically divides into several separate units; a light source of helium resonance radiation, a circularly polarizing filter to provide a suitable excitation beam of the resonance radiation, an absorbing cell containing helium to be optically pumped to an abnormal distribution in the Zeeman substates, a depumping control oscillator supplying a radio frequency field to periodically restore this distribution of the Zeeman state of the helium atoms to its normal condition, a light detector in the beam of resonance radiation effluent from the absorption cell to indicate the change in absorption of the resonance beam produced by the periodic depumping field, and a signal amplifier in the output of the detector circuit. The helium absorption cell is the basic element of the magnetometer and contains pure helium gas under reduced pressure.

In operation, the absorption cell is subjected to a high frequency field of sufficient intensity to excite some of the helium atoms to levels of the triplet series. In the normal decay from these excited triplet states the helium atoms reach the metastable first excited state of the triplet series from which the optical pumping cycle involved in the operation of the magnetometer starts. The light source provides light emitted at the excitation frequency of helium which is contained in the helium absorption cell. The depumping oscillator controls the release of helium atoms from the abnormally populated Zeeman substates of the metastable state. The frequency of this oscillator when adjusted to obtain a maximum "depumping" signal is a measure of the resonance frequency of the Zeeman substates and hence of the average strength of the magnetic field. It should be noted that the frequency of the resonance radiation of these Zeeman substates of helium is not measured directly but indirectly by observing the effectiveness of the oscillator in producing depumping from the abnormally occupied Zeeman substates. The detection of depumping, and thus the precise adjustment of the depumping oscillator frequency is accomplished by monitoring the signal produced by the excitation light detector. Lead sulfide cells are suitable for use as the detector. The small electrical signals developed in the detector by changes in the exciter beam intensity are then amplified to a useful level and applied to the control circuits including the signal amplifier.

In practice, the detection of the optimum depumping frequency can be accomplished by sweeping the frequency of the depumping oscillator periodically back and forth over the Zeeman resonance frequency and noting the oscillator frequency at which the fundamental component of the sweep rate frequency in the light detector output becomes zero. As an alternative to this frequency modulation, a field modulation system can be employed in which the strength of the field being measured can be made to periodically vary over a small range about its normal value by applying a small, low frequency, alternating current to a coil system with its axis in approximate alignment with the field being investigated.

Since the output signal upon which measurements of the magnetic field are based is developed according to the intensity of a light beam which is selectively, continuously absorbed and the overall level of energy of the signal is low, enhancement of the signal is desirable. Heretofore, it has been attempted to increase the magnitude of this signal either by increasing the intensity of the light beam from the light source or by increasing the length of the absorption path in the cell. While each of these methods is effective to some extent, each has its limitations, and the output signal magnitude can be enhanced only to a limited extent by either or both of them. Accordingly, it is desirable to find a means of further enhancing the output signal.

A substantial improvement in the detector is obtained in accordance with this invention by placing a narrow pass optical filter in the optical system after the absorption cell and before the detector to pass only the desired resonance line of helium, i.e., the 1.08-micron line. The location of the filter is critical since, if the filter is placed just following the light source for excitation, the signal output is substantially reduced. Also, if the filter is placed between the polarizing filter (normally arranged between the light source and absorption cell) and the absorption cell, the entire system will not function. However, it has been found that by placing the filter between the absorption cell and the detector so that only light at the resonance line impinges upon the detector the signal output is improved and the lamp generated noise is substantially reduced, although the filter reduces the total signal in the pass band. A suitable filter for use in this invention is an interference filter of the Fabry-Perot type for the 1.08-micron line of helium. These filters have a band pass width of approximately 100 angstroms (0.001 micron).

Referring now to the drawing, helium magnetometer unit 10 generally includes helium exciter lamp 12, circular polarizing filter 14, absorption cell 16, filter 18 and detector unit 20. Helium atoms in cell 16 which have been raised to abnormal distributions in the Zeeman sublevels of the metastable state are depumped and released to the more highly absorbing normal distributions, by a signal supplied through a depumping coil 22 from an oscillator in a manner known to the art. The depumping is, therefore, associated with a decrease in the intensity of the light beam reaching detector 20. Detector 20 produces an electrical signal corresponding to the intensity of the light beam passed through cell 16 which signal is then used to control the depumping frequency to obtain maximum depumping or absorption of light.

It is estimated from tests that less than one-half of one percent of the light reaching detector 20 is of the significant 1.08-micron line. Accordingly, a variation of one-tenth of one percent in the total light output of lamp 12 produces a change in the output of the system which can be one-fifth as great as the magnitude of the significant signal. The noise thus introduced will be 20 percent of the signal intensity. Since filter 18 removes all the spurious light, this one-tenth of one percent change in the total light changes the intensity of the light passed to detector 20 only by one-tenth of the signal light passing the filter for a one-two-hundredth reduction of noise from the unfiltered variation. With a filter signal reduction of 40%, the signal-to-noise ratio is improved by a factor of eighty times.

The absorption cell 16 comprises a closed cylindrical vessel containing spectroscopically pure helium gas at a pressure such that the metastable helium atoms produced in the discharge have sufficient lifetime to permit an alignment. The helium in the cell is excited to produce atoms in the metastable state by, for example, a high frequency electric field, produced in the vessel by electrodes (not shown) fitted at each end of the vessel. The helium in the absorption cell can also, if deired, be excited by such means as a high frequency electromagnetic field. If a high frequency electromagnetic field is used, the electrodes referred to above are unnecessary. Another method suitable for producing metastable helium atoms in the absorption cell is through the use of a quantity of natural or artificial radioactive material placed inside or adjacent to the vessel. Additionally, X-rays generated without or within the vessel can be utilized for the production of metastable helium atoms. The cylindrical vessel is fabricated from a material such as glass which is transparent to the helium resonance radiation. If desired, the vessel may be constructed of an opaque material and provided with windows transparent to the resonance radiation. The absorption cell may be of any arbitrary shape, however, the preferred shape is that of the cylinder as shown.

The helium excitation lamp 12 is essentially a discharge tube similar in operation to the aforementioned discharge tube, i.e., absorption cell 16. The lamp 12 is electrically driven by exciter lamp power oscillator 26. Since the excitation lamp 12 is used to radiate resonance radiation, it is desired to excite the helium in the lamp 12 much more strongly than in the absorption cell 16. In operation, the helium excitation lamp 12 is energized from power oscillator 26 to radiate unpolarized resonance radiation. However, the portion traveling along the optical path through absorption cell 16 is circularly polarized by circularly polarizing filter 14.

Detector 20 which monitors the helium resonance radiation transmitted through the absorption cell 16 can be any of several such devices sensitive to helium resonance radiation, i.e., the 1.08-micron line of helium. Suitable devices include lead sulfide detectors and phototubes. Detector 20 is arranged to receive the helium resonance radiation transmitted through the absorption cell 16.

The electrical signal output of the detector 20 is passed through a detector signal amplifier 32 where it is filtered to pass only the fundamental sweep frequency component. The output of amplifier 32 is applied to a phase controlled rectifier 34 which develops an error signal used to control the frequency of the depumping oscillator 24. The phase reference voltage required for the phase controlled rectifier 34 is derived from the timing circuit of frequency meter 38 which measures the frequency of the depumping oscillator 24.

Oscillator 24 applies a depumping signal to cell 16 through depumping coil 22. The depumping frequency applied to the absorption cell through coil 22 controls release of the helium atoms from the abnormal distribution in the Zeeman levels of the metastable state to the normal distribution of Zeeman levels in this metastable state. This frequency is adjusted until the fundamental component of the sweep rate frequency in the output of detector 20 is reduced to zero. In order to determine the frequency at which maximum depumping occurs, the frequency of oscillator 24 is controlled, first by a signal from the phase control rectifier 34, and second by a signal from sweep former 42. As mentioned, the error signal output of phase control rectifier 34 is dependent upon the output signal of detector 20, as filtered by detector amplifier 32, and upon the phase reference voltage obtained from frequency meter 38. The output of sweep former 42 causes the frequency of depumping oscillator 24 to periodically sweep through a limited range, and the frequency is observed at which maximum depumping occurs in absorption cell 16, as measured by detector 20. This frequency is the desired indication of the magnetic field strength.

The sweep signal produced by sweep former 42 is preferably a square wave, but it can be of any desired shape such as a triangular wave or a sine wave, for example. Preferably, the sweep wave should be symmetrical about its zero axis. It is only necessary to move the depumping oscillator frequency both above and below the proper frequency corresponding to the ambient magnetic field in order that the point of maximum light absorption in the absorption cell 16 may be sensed as evidenced by output from the phase detector 34. It is preferred to use a signal derived from the clock within frequency meter 38 to control the sweep frequency applied to the depumping oscillator 24. This permits measurement of the depumping frequency over an integral number of periods of sweep. When the sweep signal is not keyed to the frequency measuring intervals but started at any point in time and the depumping frequency measured over a period of time, the measurement does not necessarily include an integral number of sweep cycles and an error can develop in the measurement.

It is claimed:
1. In a device for measuring the strength of a magnetic field comprising a contained body of helium gas the atoms of which are acted upon by said magnetic field when in the presence thereof; means to excite the body of helium gas for continuously producing metastable helium atoms; a source of resonance radiation impingeable upon and interacting with the body of helium gas for producing alignment of said metastable helium atoms contained therein; means to create and direct into the body of helium gas an electromagnetic field of such frequency as to diminish the alignment of metastable helium atoms contained in the body of helium gas; and detector means for producing an output proportional to the intensity of impinging radiation from said source of resonance radiation which passes through said contained body of helium gas, the improvement of means for improving the signal input to said last-mentioned detector means comprising a narrow pass filter means passing only radiation of the 1.08-micron resonance line of helium arranged in the path of said radiation after said body of helium gas and before said detector means.

References Cited

UNITED STATES PATENTS 3,122,702  2/1964  Franken _____ 324—0.5

RUDOLPH V. ROLINEC, Primary Examiner

M. J. LYNCH, Assistant Examiner